L. LYNDON.
SYSTEM OF ELECTRICAL DISTRIBUTION.
APPLICATION FILED DEC. 3, 1917.
1,396,446.
Patented Nov. 8, 1921.
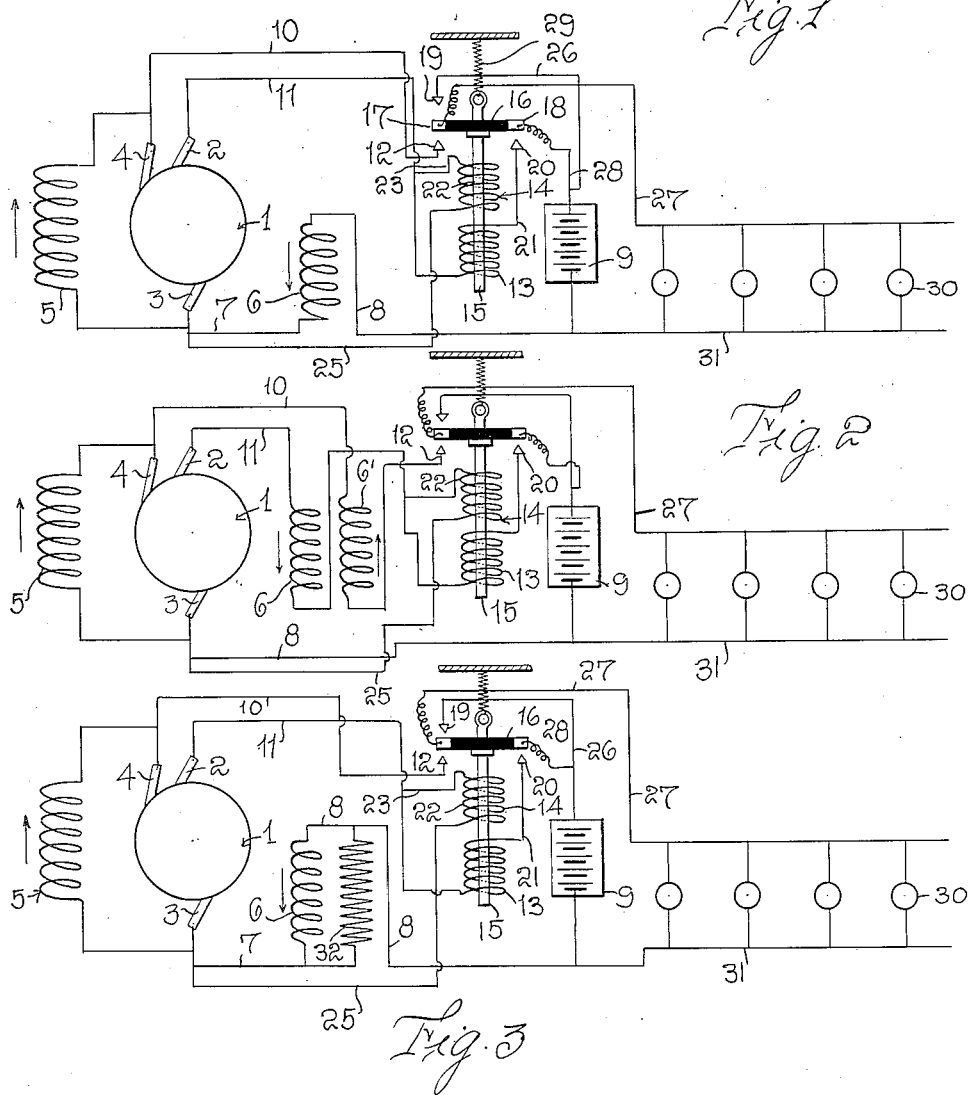

UNITED STATES PATENT OFFICE.

LAMAR LYNDON, OF ORANGE, NEW JERSEY.

SYSTEM OF ELECTRICAL DISTRIBUTION.

1,396,446. Specification of Letters Patent. Patented Nov. 8, 1921.

Application filed December 3, 1917. Serial No. 205,122.

*To all whom it may concern:*

Be it known that I, LAMAR LYNDON, a citizen of the United States, residing at Orange, in the county of Essex and State of New Jersey, have invented new and useful Improvements in Systems of Electrical Distribution, of which the following is a specification.

This invention from a generic aspect appertains to systems of electrical distribution, but it more especially comprehends those wherein a dynamo operated at variable and intermittent speeds is employed to operate lamps or other translating devices and simultaneously charge a storage battery, the latter supplying current to the lamps or translating devices when the dynamo is not in service.

The fundamental feature of this invention is the provision of means, through the instrumentality of which, the dynamo may concomitantly furnish a substantially constant voltage to the load circuit and a higher voltage to the battery circuit for charging purposes; these voltages being maintained approximately constant for any variation in dynamo speed within predetermined limits.

A further important feature of this invention resides in providing a means in connection with the generator to accomplish a suitable division of its output between lamps and battery, to avoid overloading the generator when both lamps and battery are connected in circuit, or to prevent overcharge of the battery when the lamps are disconnected from the circuit.

Other important features of this invention are: the designing of a system of electrical distribution, which is simple, practical, and effective; and one wherein the different voltages proceeding direct from the dynamo are produced without the customary insertion of resistances or other voltage regulating devices in the circuit from the dynamo to the lamps.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Figure 1 is a diagrammatic view illustrating the generator disconnected from the accumulator and consumption circuit, the automatic cut-out being in inoperative position;

Fig. 2 is a similar view illustrating a modified form in which two series field windings are employed; and Fig. 3 is a similar view illustrating a further modification, in which a shunt is used in connection with the series field winding.

Briefly stated, this invention comprises a generator of the three brush type, a shunt field arranged across brush 4 and the negative brush 3, a series field opposing the shunt field through which the entire output of the generator is adapted to pass, a load circuit, a battery circuit including a storage battery and an automatic cutout coöperating with the respective circuits.

To those familiar with the art under discussion, it is a well known fact, that the voltage necessary to bring the storage battery to full charge is considerably greater than that delivered by the battery when it discharges, and, consequently, if the generator voltage be sufficiently high to properly replenish the battery, it will exceed the requirements of the lamps or other translating devices. In view of the differing voltages for the battery and load circuits, it has been customary to insert resistances, counter-cells, counter-electro motive forces, from some character of dynamo electric machines or other regulating means, in series with that portion of the circuit leading to the lamps or other translating devices, however, being subject to adjustment because of the variation of voltage drop through them as a greater or smaller number of lamps are connected to or disconnected from the circuit; this arrangement is objectionable, and for this reason I have designed the system of electrical distribution forming the subject matter of this invention.

In the illustrated embodiment characterizing this invention, there is shown a diagrammatic dynamo armature 1 having brushes 2, 3, and 4, respectively, a shunt coil 5 arranged between brushes 3 and 4, and a reverse series field winding 6 opposing shunt coil 5, connected at one extremity by conductor 7 to negative brush 3, its other extremity being connected by conductor 8 to the negative pole of battery 9. The remaining brushes 2 and 3 being connected, respectively, by conductors 10 and 11 to switch point 12, and series coil 13 of automatic cut-out 14.

This automatic cut-out 14 embodies a movable core 15 carrying a cross-head 16 of insulated material and equipped at its extremities with metallic contacts 17 and 18 adapted to coöperate with the switch points 12, 19 and 20, the latter being connected by conductor 21 to the free end of series coil 13 hereinbefore mentioned, which coöperates with shunt coil 22 for the purpose of actuating core 15, said shunt coil being connected at one extremity by conductor 23 to conductor 11, and at its other extremity by conductor 25 to negative brush 3. The remaining switch point 19, is connected by conductor 26 to the positive pole of battery 9, while the two metallic contacts 17 and 18 of cross-head 16 are connected, respectively, to conductor 27 of the load circuit, and to the positive pole of battery 9 by conductor 28. In order to restore core 15 of the automatic cut-out to its initial position after releasement by its coils, a spring 29 is employed, one end of said spring being anchored to a suitable support, the other attached to the extremity of core 15. Lamps or other translating devices 30 are arranged across conductors 27 and 31 constituting positive and negative sides of the load circuit, hereinbefore mentioned, said conductor 31 being connected to the negative side of battery 9.

Having outlined the various components of this invention there now remains to describe its operation, which is as follows:

Presuming the dynamo to be generating its proper voltage, and the two metallic contacts 17 and 18 on the cross-head of the automatic cut-out in contact with switch points 12 and 20, a circuit will be established from brush 2 to the positive pole of battery via conductor 11, series coil 13 to the automatic cut-out, conductor 21, switch-point 20, contact 18 and conductor 28, and from the negative pole of the battery to brush 3 via conductor 8, series coil 6 and conductor 7; while another circuit is established from brush 4 to the positive side of the load circuit via conductor 10, switchpoint 12, contact 17 and conductor 27; the negative side of the load circuit being connected with brush 3 via conductors 31, 8, and series coil 12. Owing to the adjustment of brushes 2 and 4 when the proper potential is impressed across the terminals of the battery, the desired voltage is also impressed across the lights or other translating devices, this latter voltage being less than that impressed across the battery terminals.

With current flowing as previously stated, from the dynamo through the storage battery and load circuit, it is evident, series coil 13 will add its magnetism to that of shunt coil 22, thus giving a downward pull to cross-head 16 in addition to that produced by reason of the potential impressed across the winding of coil 22. This additional pull insures a firm and secure engagement between switchpoints 12 and 20 and contacts 17 and 18.

When the battery tends to discharge through the dynamo armature, the current flowing in a reverse direction through series coil 13 opposes the magnetism of shunt coil 22, and in consequence weakens the pull on core 18, whereupon the latter is actuated by spring 29 so that contacts 17 and 18 are withdrawn from switchpoints 12 and 20. This upward movement of cross-head 16 continues until contact 17 is in engagement with switchpoint 19. Owing to this change in the position of said contacts 17 and 18, the circuit from brush 2 to the storage battery is open, likewise the circuit from brush 4 to the lamps or other translating devices, the battery, however, can now discharge via conductor 26, switchpoint 19, contact 17, conductor 27, through the lamps or other translating devices, and back to the battery via conductor 31. This arrangement places the battery directly across the working circuit, but as it is discharging, its voltage is lower than when it was being charged, and this lower voltage of discharge is approximately that desired across the load circuit.

The regulation of the machine to afford an approximate voltage is accomplished by the combination of three factors, armature reaction, distortion of the magnetic flux at the pole horns with increase in speed or armature currents and consequent diminution in voltage between brushes 3 and 4 for a given speed increase, and the action of the counter series field previously mentioned. In practice it has been found, for a change in speed of 250 per cent., a commercial machine constructed according to this invention will give a voltage variation of not over 10 per cent. across the consumption circuit.

To produce a suitable division of the load between the accumulator and the consumption circuit to avoid overloading the generator when both accumulator and consumption circuit are connected thereto, and to prevent undercharge of the accumulator when the lamps or other translating devices are disconnected from the circuit, I employ a reverse series field winding 6, which is arranged so as to carry the total generator current. When the generator is charging the battery only, the latter receives its total capacity, while on the other hand, if when charging the battery, the load is connected to the circuit, the generator voltage, will be immediately reduced, owing to the action of the reverse series coil 6, inasmuch as the additional load current passing through it reduces the voltage of the dynamo which in turn reduces the current sufficiently to maintain the total output within proper operating limits, thus preventing overloading of the generator and at the same time producing a division of the generator output between the battery and the consumption circuit, the battery receiving the total output when the load is disconnected from the circuit.

Although certain specific means have been specified as best adapted to perform the functions allotted to them, nevertheless, it is to be understood that various modifications may be resorted to without departing from or sacrificing any of the principles of this invention, as for example, the generator could be supplied with two reverse series field windings, 6 and 6', one in the lamp circuit and the other in the battery circuit, as indicated in Fig. 2. Moreover, instead of passing all of the current through the reverse series field winding a portion could be shunted around such winding by means of a shunt connection 32, whereupon the magneto motive forces created by the series winding would be as truly proportional to the total current output of the generator, as if the entire current was passed through it.

In conclusion it will be observed that I have developed a system of electrical distribution embodying a three brush dynamo possessing inherent self regulation for substantially constant voltage at widely varying speeds.

Having now described my invention, and without enumerating variations and equivalents, what I desire protected by Letters Patent is as set forth in the following claims:

1. A system of electrical distribution comprising a generator, an accumulator, a consumption circuit, means to supply the consumption circuit from the accumulator, or from the generator when charging the accumulator, means to effect a voltage for the accumulator and consumption circuits commensurate with their operating requirements, and additional means in conjunction with the generator, permanently included in the accumulator and consumption circuits and carrying the total generator output to automatically produce a division of the load between the accumulator and consumption circuit, substantially as described.

2. A system of electrical distribution comprising a generator, an accumulator, a consumption circuit, means to supply the consumption circuit from the accumulator, or from the generator when charging the accumulator, means to effect a voltage for the accumulator and consumption circuit commensurate with their operating requirements, and a reverse series field in conjunction with the generator, permanently connected to the accumulator and consumption circuits to automatically produce a division of the load between the accumulator and consumption circuit, substantially as described.

3. A system of electrical distribution comprising a generator, an accumulator, a consumption circuit, means to supply the consumption circuit from the accumulator, or from the generator when charging the accumulator, and a reverse series field on the generator, permanently connected to the accumulator and consumption circuits and carrying the total generator output to produce a division of the load between the accumulator and consumption circuit, substantially as described.

4. A system of electrical distribution comprising a generator, an accumulator, a consumption circuit, means to simultaneously supply the accumulator with a high and the consumption circuit with a low voltage, respectively, an electro-magnetically controlled cut-out adapted to disconnect the generator when its voltage drops below that of the accumulator and position the latter in discharging relation with respect to the consumption circuit, and a reverse series field in conjunction with the generator, permanently connected to the accumulator and consumption circuits to automatically produce a division of the load between the accumulator and consumption circuit, substantially as described.

5. A system of electrical distribution comprising a consumption circuit, an accumulator circuit including an accumulator, a generator embodying positive and negative brushes adjusted to supply a high voltage and connected with the accumulator circuit, and an auxiliary brush connected with the consumption circuit and adjusted relative to the positive brush to supply a lower voltage, automatic means to disconnect the generator and position the accumulator in discharging relation with respect to the consumption circuit and a reverse series field in conjunction with the generator, permanently connected to the accumulator and consumption circuits to automatically produce a division of the load between the accumulator and consumption circuit, substantially as described.

6. A system of electrical distribution comprising a consumption circuit, an accumulator circuit including an accumulator, a generator designed to give an approximately constant voltage at widely varying speeds and embodying positive and negative brushes adjusted to supply a high voltage and connected with the accumulator circuit, and an auxiliary brush connected with the consumption circuit and adjusted relative to the positive brush to supply a lower voltage thereto, automatic means to disconnect the generator and position the accumulator in discharging relation with respect to the consumption circuit, and a reverse series field in conjunction with the generator, permanently connected to the accumulator and consumption circuits to automatically produce a division of the load between the accumulator and consumption circuit, substantially as described.

7. A system of electrical distribution comprising a consumption circuit, an accumulator circuit including an accumulator, a generator designed to give an approximately constant voltage at widely varying speeds and embodying positive and negative brushes adjusted to supply a high voltage and connected to the accumulator circuit, and an auxiliary brush connected with the consumption circuit and adjusted relative to the positive brush to supply a lower voltage thereto, automatic means to disconnect the generator and position the accumulator in discharging relation with respect to the consumption circuit, a shunt field arranged across the auxiliary and negative brushes, and an opposing series field in conjunction with the generator, permanently connected to the accumulator and consumption circuits to automatically produce a division of the load between the accumulator and consumption circuit, substantially as described.

8. A system of electrical distribution comprising an accumulator, a consumption circuit, a generator designed to give an approximately constant voltage at widely varying speeds, means to supply the consumption circuit from the accumulator, or from the generator when charging the accumulator, and means permanently included in the consumption and accumulator circuits and carrying the total generator output to effect a voltage for the accumulator and consumption circuit commensurate with their operating requirements, substantially as described.

9. A system of electrical distribution comprising an accumulator, a consumption circuit, a generator designed to give an approximately constant voltage at widely varying speeds, means to supply the consumption circuit from the accumulator, or from the generator when charging the accumulator, means to effect a voltage for the accumulator and consumption circuit commensurate with their operating requirements, and additional means in conjunction with the generator, permanently included in the accumulator and consumption circuits and carrying the total generator output to automatically produce a division of the load between the accumulator and consumption circuit, substantially as described.

LAMAR LYNDON.

Witnesses:
W. R. SHAY,
W. R. COOK.